US 6,709,570 B1

(12) United States Patent
Van Crijnen-Beers et al.

(10) Patent No.: US 6,709,570 B1
(45) Date of Patent: Mar. 23, 2004

(54) METHOD FOR PREPARING A CATALYST

(75) Inventors: Maria Barbara Hendrica Van Crijnen-Beers, Amsterdam (NL); Jean-Paul Darnanville, Grand Couronne (FR); Carolus Matthias Anna Maria Mesters, Amsterdam (NL); Thomas Joris Remans, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/664,293

(22) Filed: Sep. 18, 2000

(30) Foreign Application Priority Data

Sep. 27, 1999 (EP) ............................................. 99402401

(51) Int. Cl.⁷ .......................... C10G 47/00; C07C 5/22; B01J 29/04
(52) U.S. Cl. .................. 208/111.01; 208/109; 208/110; 208/111.35; 585/477; 585/481; 502/63; 502/71; 502/74; 502/77; 502/232; 502/439; 502/514
(58) Field of Search ................................. 208/109, 110, 208/111.01, 111.35, 217, 251 H, 254 H, 143; 585/477, 481; 502/63, 71, 74, 77, 232, 439, 514

(56) References Cited

U.S. PATENT DOCUMENTS

| | | | | |
|---|---|---|---|---|
| 3,140,249 A | | 7/1964 | Plank et al. ................. 208/120 |
| 3,140,251 A | | 7/1964 | Plank et al. ................. 208/120 |
| 3,140,253 A | | 7/1964 | Plank et al. ................. 208/120 |
| 3,377,295 A | * | 4/1968 | Pryor ........................... 502/64 |
| 3,645,914 A | * | 2/1972 | Rosinski et al. ............... 502/65 |
| 4,256,682 A | * | 3/1981 | Denton ........................ 502/232 |
| 4,503,023 A | * | 3/1985 | Breck et al. ................. 423/328 |
| 4,582,815 A | * | 4/1986 | Bowes ......................... 502/64 |
| 4,899,011 A | | 2/1990 | Chu et al. .................... 585/481 |
| 5,053,374 A | * | 10/1991 | Absil et al. .................. 502/64 |
| 5,157,191 A | | 10/1992 | Bowes et al. ................ 585/533 |
| 5,182,242 A | * | 1/1993 | Marler ......................... 502/66 |
| 5,430,000 A | * | 7/1995 | Timken ....................... 502/60 |
| 5,500,199 A | * | 3/1996 | Bellussi et al. ........... 423/328.2 |
| 5,516,956 A | | 5/1996 | Abichandani et al. |
| 5,551,956 A | | 9/1996 | Moriyama et al. ............ 44/301 |
| 5,554,274 A | | 9/1996 | Degnan et al. ............. 208/111 |
| 5,689,027 A | | 11/1997 | Abichandani et al. ...... 585/481 |
| 5,804,058 A | | 9/1998 | Grandvallet et al. ........ 208/171 |

FOREIGN PATENT DOCUMENTS

| | | |
|---|---|---|
| WO | WO 96/16005 | 5/1996 |
| WO | WO 00/29511 | 5/2000 |
| WO | WO 00/29512 | 5/2000 |

OTHER PUBLICATIONS

International Search Report of Jan. 23, 2001.

* cited by examiner

Primary Examiner—Walter D. Griffin

(57) ABSTRACT

A method for preparing a catalyst comprising a zeolite and a low acidity refractory oxide binder which is essentially free of alumina which method comprises:

(a) preparing an extrudable mass comprising a substantially homogenous mixture of zeolite, water, a source of the low acidity refractory oxide binder present which comprises an acid sol, and an amine compound, (b) extruding the extrudable mass resulting from step (a), (c) drying the extrudate resulting from step (b); and, (d) calcining the dried extrudate resulting from step (c).

21 Claims, No Drawings

METHOD FOR PREPARING A CATALYST

The invention relates to a method for preparing a catalyst comprising a zeolite and a low acidity refractory oxide binder which is essentially free of alumina.

Such a method is described in patent publication U.S. Pat. No. 5,053,374 which illustrates the preparation of a silica-bound USY catalyst. In this preparation 65 weight parts of the zeolite in the form of a powder was mixed with 35 weight parts of silica consisting of various ratios of an amorphous precipitated silica (PPG Industries HiSil 233 EP) and a basic colloidal silica of the type Ludox HS-30. A homogenous mix was obtained by mulling. The moisture content of the mix was adjusted to 42–47 weight percent with deionized water. The mix was extruded to yield an extrudate. The extrudates were subsequently dried and ammonium exchanged to remove sodium and subsequently calcined.

When contents of binder and zeolite are used in the context of the present invention the content on a dry basis is meant. When a pH value is mentioned the pH as measured in water of 18° C. is meant.

There remains room to improve the strength of the catalyst extrudates as obtained by the process as described in U.S. Pat. No. 5,053,374. This is especially true when catalyst extrudates are made having a zeolite content of below 50 wt %. It appears that the strength of the catalyst is negatively influenced when the zeolite content is reduced. For some applications a zeolite content of well below 50 wt % is advantageous in terms of improved selectivity and activity of the catalysed reaction. An example of such an application is the catalytic dewaxing process as described in WO-A-200029511.

The object of the present invention is a process to prepare a low acidity refractory oxide bound zeolite catalyst having a high crushing strength. A further object is to provide a process which enables one to prepare silica bound catalysts of sufficient strength having a zeolite content of below 50 wt %.

The object of the invention is achieved by the following process. A method for preparing a catalyst comprising a zeolite and a low acidity refractory oxide binder which is essentially free of alumina which method comprises:

(a) preparing an extrudable mass comprising a substantially homogenous mixture of zeolite, water, a source of the low acidity refractory oxide binder present as an acid sol and an amine compound, (b) extruding the extrudable mass resulting from step (a), (c) drying the extrudate resulting from step (b); and, (d) calcining the dried extrudate resulting from step (c).

Catalyst particles obtained by the above process have an increased crushing strength. This is advantageous because such catalysts are typically applied in a packed bed reactor. Due to the normally high operating pressure and mass flows in the reactor strong catalyst particles are advantageous.

Examples of the low acidity refractory oxide binder material which is essentially free of alumina are silica, zirconia, titanium dioxide, germanium dioxide, boria and mixtures of two or more of these like for example silica-zirconia and silica-titania. A preferred binder is silica. The description of the invention will further refer to a silica binder only. It will be understood that the below preferred conditions will, when applicable, also apply to other possible binders as here described.

The acid silica sol may be any colloidal silica having a pH lower than 7. An example of a suitable acid silica sol is Nyacol 2034DI which can be obtained from PQ Corp, Valley Forge, Pa. or Ultra-Sol 7H from RESI Inc, Newark. The surface of the acid silica sol particle comprises —OH groups. It is believed that for obtaining a catalyst particle having a sufficient strength it is essential that during the mixing of the components in step (a) some or all of these groups are converted to —O$^-$ groups. This is achieved by adding the amine compound in step (a). It has further been found that when adding the amine compound just before performing step (b) an even more stronger catalyst particle is obtained. It is believed, although we do not wish to be bound to this theory, that the stronger catalyst is obtained because not all of the —OH groups on the sol particle surface are converted into —O$^-$ groups. Thus step (a) is preferably performed by first mixing the zeolite and the acid silica sol into a first homogeneous mixture and subsequently adding the amine compound to the first homogeneous mixture such that the pH of the resulting second mixture is raised from below 7 to a value of above 8. It can be easily determined by one skilled in the art, by straightforward experimentation, what the optimal moment in step (a) is for adding the amine compound. As a guideline it is preferred to add the amine compound during the second half of the time and more preferably in the last quarter of the time required to mix the components in step (a). Most preferably the amine compound is added within 20 minutes before performing step (b).

The extrudable mass in step (a) should have a sufficient viscosity in order to be extruded into shapes. One skilled in the art will know how to achieve such a paste like mixtire. For example by adding water in step (a) the viscosity can be lowered. The water content of the sol may be between 60 and 80 wt %. Preferably the water content of the extrudable mass as obtained in step (a) does not exceed 60%, and preferably is at least 35% by weight.

When preparing catalysts having a lower zeolite content, especially lower than 50 wt %, it becomes more difficult to achieve a sufficient high viscosity and preferably some of the acid silica sol is replaced by silica powder as the silica source. To obtain the strongest catalysts it is preferred to maximise the amount of acid silica sol used relative the amount of silica powder used, while still achieving a sufficient viscosity of the extrudable mass. The optimal amount of silica powder to be used will depend on the zeolite content, wherein at a low zeolite content of the catalyst, more silica powder will have to be used. One skilled in the art can easily determine the optimal composition in view of the above teaching. The silica powder may be commercially obtained silica powder, for example Sipernat 22 or 50 (as obtained from Degussa AG), Nasilco Ultrasil VN3SP or HiSil 233 EP from PPG Industries. The solid silica powder particles preferably have a mean diameter of between 10 $\mu$m and 200 $\mu$m.

The amine compound is preferably a compound according to the general formula $R^1R^2R^3N$ in which $R^1$–$R^3$ may be hydrogen and/or an alkyl group having 1–6 carbon atoms. Examples are ammonia, methyl ethyl amine, triethyl amine, of which ammonia, is the most preferred. The amine compound should preferably be added in such an amount in order to raise the pH of the mass to alkaline conditions. Preferred conditions are a pH of the mixture obtained in step (a) of above 8. The pH will be lower than 14.

Step (a) may for example be performed at ambient conditions by first mixing the zeolite, optionally the silica powder and acid silica sol, subsequently adding an amine compound and optionally at the end of step (a) a plasticising agent. The plasticiser agent is used to increase the viscosity of the mixture in order to obtain an extrudable mass.

Suitable plasticising agents are for example dextrose, gelatine, glucose, glues, gums, salts, waxes, starch and cellulose ethers. Some typical cellulose ether binders are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co.

The extrusion in step (b) may be performed by well known processes as for example illustrated in Perry's Chemical Engineers' Handbook, McGRAW-HILL International Editions, sixth edition, 1984, p 8–60 to 8–66 and in Particle Size Enlargement, Handbook of powder Technology Vol. 1, Elsevier, 1980, p 112–121. Examples of such methods are extrusion performed by a screw extruder, a plate or ram extruder. The extrudates can have a wide variety of forms and sizes.

Drying step (c) and calcining step (d) may be performed under conditions well known to one skilled in the art. Step (c), for example, may take place at a temperature of at least 60° C. to about 250° C., for a time sufficient to dry the extrudate, for example, for at least 1 hour. Calcining step (d), for example, may take place in air, or other inert gas, at temperatures ranging from 250° C. to 850° C. for periods of time ranging, for example, from about 1 to about 48 hours or more.

The method of preparing a low acidity refractory oxide-bound zeolite of this invention is not limited to any particular zeolite and in general includes all metallosilicates, particularly the aluminosilicates whether or not previously dealuminized to increase the framework silica:alumina ratio. Typical zeolites include ZSM-4 (Omega), ZSM-5; ZSM-11, ZSM-12, ZSM-20, ZSM-22, ZSM-23, ZSM-35, ZSM-48, ZSM-50, Beta, X, Y and L as well as ferrierite and mordenite.

Catalysts of improved selectivity and other beneficial properties can be obtained by subjecting the catalyst extrudates to a dealumination treatment. Dealumination can be attained by methods known in the art, such as for example acid leaching or by a steam treatment. Steam treatment is effected by contacting the catalyst extrudates with steam at elevated temperatures ranging from about 250° C. to 650° C. and preferably from about 400° C. to 550° C. The treatment can be accomplished in an atmosphere of 100% steam or in an atmosphere consisting of steam or ammonia and some other gas which is essentially inert to the zeolites. A similar treatment can be accomplished at lower temperatures and elevated pressure, e.g., from about 180° C. to 370° C. at from about 10 to about 200 atmospheres.

Particularly useful dealumination methods are those, wherein the dealumination selectively occurs, or anyhow is claimed to occur selectively, at the surface of the crystallites of the molecular sieve. Preferably dealumination is performed by a process in which the zeolite is contacted with an aqueous solution of a fluorosilicate salt wherein the fluorosilicate salt is represented by the formula:

$$(A)_{2/b}SiF_6$$

wherein 'A' is a metallic or non-metallic cation other than H+ having the valence 'b'. Examples of cations 'b' are alkylammonium, $NH_4^+$, $Mg^{++}$, $Li^+$, $Na^+$, $K^+$, $Ba^{++}$, $Cd^{++}$, $Cu^+$, $Ca_{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation. The zeolite material may be contacted with the fluorosilicate salt in an amount of at least 0.0075 moles per 100 grams of the zeolite material. The pH is suitably between 3 and 7. An example of the above described dealumination process is described in U.S. Pat. No. 5,157,191.

The original cations associated with each of the zeolites utilized herein can be replaced by a wide variety of other cations employing techniques well known in the art. Such a replacement of cations is suitably performed after the above described optional dealumination step. Typical replacing cations including hydronium, ammonium, alkyl ammonium and metal cations. Suitable metal cations include metals such as rare earth metals, as well as metals of Groups IIA and B of the Periodic Table, e.g., zinc, and Group VIII of the Periodic Table, e.g., platinum, palladium and nickel.

Typical ion-exchange techniques call for contacting the selected zeolite with a salt of the desired replacing cation. Although a wide variety of salts can be employed, particular preference is given to chloride, nitrates and sulfates. Representative ion-exchange techniques are disclosed in a wide variety of patents including U.S. Pat. No. 3,140,249, U.S. Pat. No. 3,140,251 and U.S. Pat. No. 3,140,253.

Following contact with a solution of the desired replacing cation, the catalyst is then preferably washed with water and dried and/or calcined as for example described above for step (c) and step (d).

The catalyst prepared by the method of this invention can find utility in a wide variety of processes which are both catalytic and non-catalytic. Quite obviously, the materials can be used as absorbents. Additionally, the materials can be used as catalysts for a wide variety of hydrocarbon conversions. As is known in the art, a low acidity refractory oxide such as silica has low catalytic activity such that incorporation of a zeolite in the silica leads to some unusual effects. The low acidity refractory oxide can be used as a support for a catalytic material, e.g., a hydrogenation component such as platinum, palladium, cobalt, molybdenum, iron, tungsten, nickel or mixtures of the same. In addition, the low acidity refractory oxide-bound zeolite extrudates find utility in hydrocracking, isomerization, hydrogenation, dehydrogenation, polymerization, reforming, catalytic cracking, catalytic hydrocracking, toluene disproportionation, and the like. Thus, the extrudates of this invention can be used with or without added active metal components for catalytic cracking, isomerization, alkylation, reforming and hydrogenative conversions such as hydrocracking, hydrogenation and hydrofining, e.g., desulfurization and denitrogenation. In some types of hydrocarbon conversions, e.g., hydroprocessing, reforming, catalytic cracking and catalytic hydrocracking the use of a low-acidity refractory oxide-bound zeolites having lower levels of inherent activity than their alumina-bound counterparts can result in lower coke production and significant increases in cycle length.

Catalysts prepared by the process according the invention can be advantageously used as dewaxing catalyst under well known catalytic dewaxing conditions in a process to prepare a lubricating base oil, a gas oil or as part of a hydrocracker process, which main products are middle distillates. Examples are described in WO-A-200029511, WO-A-200029512 and U.S. Pat. No. 5,804,058 which are hereby incorporated by reference. Especially suitable are catalysts wherein the zeolite is ZSM-5, ZSM-12, ZSM-22, ZSM-23 or SZZ-32. More preferably the catalyst extrudate is subjected to a dealumination treatment as described above and even more preferably the zeolite is ion exchanged to incorporate a platinum, palladium or nickel metal. A preferred catalyst has a zeolite content of below 50 wt %. The lower zeolite level is preferably 10 wt %. Below this level the activity becomes too low for practical application of the catalyst.

The catalyst prepared by according to this invention may also be suitably be used in a xylene isomerisation process as for example described in U.S. Pat. No. 5,554,274, U.S. Pat. No. 4,899,011, U.S. Pat. No. 5,689,027, U.S. Pat. No. 5,516,956 and WO-A-9616005 which are hereby incorporated by reference.

The invention shall be illustrated by the following non-limiting examples.

Comparative Experiment A

On a dry basis, 60 weight parts of ZSM-5 (CBV8014 as obtained from Zeolyst International) were intimately admixed with 15 weight parts of amorphous precipitated silica powder (Sipernat-50 as obtained from Degussa) and with 25 weight parts of acid colloidal silica (Nyacol 2034DI as obtained from PQ Corporation); a homogenous mix was obtained by mulling. The total moisture content of the mix was adjusted to 55 weight percent with deionized water.

5 minutes before extruding the mixture a plasticiser agent, Methocel source (containing 2.1 wt % methocel), was added to the extrudable mass in a ratio of 7/100 of Methocel source relative to the zeolite dry mass. The mixture was extruded to yield cylinder extrudates with a diameter of 1.6 mm. The extrudates were subsequently dried at 120° C. for typically 2 hours in air and then calcined at 800° C. for 5 hours.

The Flat Plate Crushing Strength was measured by determining the force in N/cm at which the cylinder extrudate was crushed between two parallel flat plates. The cylinder extrudate was positioned between the plates in such that the cylindrical axis was parallel with the plates. This procedure was repeated 40 times and the average force at which crushing was observed was the resulting Flat Plate Crushing Strength (FPCS). In this example a FPCS of 60 N/cm was measured. See also Table 1.

Comparative Experiment B

Comparative Experiment A was repeated except that the ZSM-5 content was 30 wt %, the silica powder content was 35 wt % and the acid silica sol content was 35 wt %. A FPCS of 86 N/cm was measured. As a result of the lower ZSM-5 content as compared to Comparative Experiment A one would expect a lower FPCS. The resulting higher FPCS is a result of the higher content of acid silica sol as compared to Comparative Experiment A. The FPCS is however not high enough for commercial application. A value of higher than 100 N/cm is desirable. See also Table 1.

Comparative Experiment C

Comparative Experiment B was repeated except instead of acid silica sol the same amount of basic colloidal silica of the type Ludox HS-30 was used. The Flat Plate Crushing Strength was 80 N/cm.

EXAMPLE 1

Comparative Experiment B was repeated except that, after mixing the ZSM-5, silica powder and acid colloidal silica, ammonia was added. Ammonia as a 2.5 wt % aqueous solution was added in a ratio of 1/12 ammonia solution relative to the zeolite dry mass. The resulting pH was 8.8. After adding the ammonia the mixing was continued for 35 minutes before extruding. The Flat Plate Crushing Strength was 122 N/cm. See also Table 1.

EXAMPLE 2

Example 1 was repeated except that ammonia was added after 35 minutes after mixing the ZSM-5, silica powder and acid colloidal silica. After adding the ammonia the mixing was continued for 10 minutes before extruding. The Flat Plate Crushing Strength was 178 N/cm.

TABLE 1

| Experiment | ZSM-5 content (wt %) | Silica powder (wt %) | Silica sol (wt %) | acidity of used silica sol | ammonia added | FPCS (N/cm) |
|---|---|---|---|---|---|---|
| Comp. A | 60 | 15 | 25 | acid | no | 60 |
| Comp. B | 30 | 35 | 35 | acid | no | 86 |
| Comp. C | 30 | 35 | 35 | basic | no | 80 |
| Example 1 | 30 | 35 | 35 | acid | 35 minutes before extrusion | 122 |
| Example 2 | 30 | 35 | 35 | acid | 10 minutes before extrusion | 178 |

What is claimed is:

1. A method for preparing a catalyst comprising a zeolite and a low acidity refractory oxide binder which is essentially free of alumina comprising:
   (a) preparing an extrudable mass by first mixing a zeolite and an acid silica sol into a first homogeneous mixture having a pH below 7 and subsequently adding an amine compound to the first homogeneous mixture such that the pH of the resulting second mixture has a value of above 8,
   (b) extruding the extrudable mass resulting from step (a),
   (c) drying the extrudate resulting from step (b); and,
   (d) calcining the dried extrudate resulting from step (c) thereby providing said catalyst.

2. The method of claim 1 wherein the amine compound is added in step (a) within 20 minutes of performing step (b).

3. The method of claim 2 wherein the zeolite content, on a dry basis, is below 50 wt % as calculated on the finished catalyst and wherein further included in said first homogenous mixture is a powder of a low acidity refractory oxide binder material.

4. The method of claim 3 wherein the low acidity refractory oxide binder material is silica.

5. The method of claim 4 wherein the amine compound is ammonia.

6. The method of claim 5 wherein the zeolite is selected from the group consisting of ZSM-5, ZSM-12, ZSM-22, ZSM23, and SZZ-32.

7. The method wherein the catalyst produced by the method according to claim 1 is subjected to a dealumination treatment.

8. The method according to claim 7 wherein the dealumination treatment is performed by a process in which the zeolite is contacted with an aqueous solution of a fluorosilicate salt wherein the fluorosilicate salt is represented by the formula:

wherein A is a metallic or non-metallic cation other than H+ having the valence b.

9. The method wherein a catalyst prepared by the method of claim 1 is subjected to a cation exchange treatment wherein a palladium, platinum or nickel metal is loaded on the catalyst.

10. A hydrocarbon conversion process comprising the step of contacting a hydrocarbon feedstock with the catalyst produced according to the method of claim 1.

11. The process of claim 10 wherein the process is a catalytic dewaxing process.

12. The process of claim 10 wherein the process is a xylene isomerization process.

13. A method, comprising:

mixing a zeolite and an acid silica sol and forming a first homogeneous mixture having a pH below 7; and adding to said first homogeneous mixture an amine compound in an amount so as to provide a resulting second mixture having a pH above 8 thereby forming an extrudable mass.

14. A method as recited in claim 13 wherein in said mixing step water is further mixed with said zeolite and silica acid silica sol such that said extrudable mass has a water content not exceeding 60 percent.

15. A method as recited in claim 14 wherein in said mixing step silica powder is further mixed with said zeolite and said acid silica sol.

16. A method as recited in claim 15 wherein said zeolite is a metallosilicates.

17. A method as recited in claim 16 wherein said amine compound is a compound having the general formula of $R_1R^2R^3N$ wherein $R^1$, $R^2$, and $R^3$ are each either hydrogen or an alkyl group having 1 to 6 carbon atoms.

18. A method as recited in claim 17 wherein said acid silica sol is a colloidal silica having a pH lower than 7.

19. A method as recited in claim 18 further comprising:

extruding said extrudable mass to form an extrudate;

drying said extrudate to form a dried extrudate; and calcining said dried extrudate to form a catalyst.

20. A method as recited in claim 19 wherein said catalyst comprises said zeolite and a low acid refractory oxide binder which is essentially free of aluminum.

21. A method as recited in claim 20 wherein the zeolite content of said catalyst, on a dried basis, is below 50 weight percent of said catalyst.

* * * * *